Patented Sept. 17, 1935

2,014,700

UNITED STATES PATENT OFFICE 2,014,700

ASPHALT TERRAZZO COMPOSITION AND METHOD OF LAYING THE SAME

Joseph Salvi and George S. Cunning, Los Angeles, Calif.

No Drawing. Application October 17, 1933, Serial No. 693,952

2 Claims. (Cl. 94—20)

Our invention relates to an asphalt terrazzo composition and method of laying the same.

It is well recognized that the previously known forms of terrazzo, in which Portland cement, lime, magnesite, and the like cementitious materials are used as a binding agent for the rock, sand and other mineral aggregates making up the composition are rigid, non-resilient, comparatively heavy, and incapable of withstanding expansion and contraction due to changes in temperature, and structural strains, without cracking. Such terrazzo is also easily attacked and disintegrated by acids and other corrosive agencies. It has been proposed to use terrazzo compositions using asphalt as a base in order to overcome some of the defects just mentioned but such asphalt terrazzo compositions have been unsuccessful for the reason that it was difficult or impossible to grind and polish the top surface.

We have discovered that when an asphalt is used, which is emulsified by the use of hydrous magnesium silicate, the resulting terrazzo composition has the desired degree of resiliency, flexibility, non-corrodibility, that it is waterproof, and insensitive to structural strains, yet capable of being easily ground and polished, presenting a smooth glossy surface. Our terrazzo composition may be applied to the foundation in the same manner as the ordinary cement terrazzo and without the necessity of using heat or heated materials to secure workability in any of the materials employed.

In this specification we use the phrase "aggregate materials" to designate limestone, marble, granite, quartz, cork, pumice, slate, diatomaceous earth, pigments, fragments of artificially made compositions, sawdust and the like. Under absorbent material we use hydraulic cement, calcined magnesite and the like, which serve to hasten the hardening of the matrix.

Our invention consists in the composition of matter and the steps of laying the same hereinafter described and claimed.

We take approximately 56 percent by volume of emulsified asphalt, approximately 34 percent by volume of aggregate, and 10 percent by volume of absorbent material, and sufficient water to form a plastic mass similar to ordinary cement concrete. It is necessary that the asphalt be emulsified by means of hydrous magnesium silicate. As a preferred example, there may be mixed emulsified asphalt containing 57 percent of asphalt, 1½ percent of hydrous magnesium silicate, and 41½ percent of water, which is in the form of a black paste and may be obtained on the market under the trade name of "Standard Bitutect". It may be mentioned here that emulsified asphalt using clay as an emulsifying agent is not suitable because of the resulting stickiness of the surface making it difficult or impossible to grind and polish the surface.

We mix the ingredients thoroughly and apply or lay the same upon a suitably prepared foundation or base of gravel, celite, concrete, metal, artificial stone, cork, or wood composition, or artificial boards or wood, tile, asphaltic concrete, iron, composition roofs, or decks, or other suitable building materials. It will be understood that the term foundation is intended to include all of the various materials designated to secure suitable bases on which to apply our composition. The foundation is prepared by cleaning it thoroughly so that the same may be free of all foreign matter and is preferably first coated with a layer of emulsified asphalt. Directly on the coated foundation our composition is applied to a thickness ranging from ¾ of an inch to 4 inches, which composition may be given a desired color by adding suitable pigments. On the surface a so called "seeding" or even distribution of suitable rocks or material such as marbles, limestones, gravels, granites of any size or color desired, is scattered and the same is tamped, rolled and trowled into the base matrix. Such operation will bring to the surface the excess of water and asphalt, leaving the layer of the composition as solid as possible. The supernatant water and asphalt is now removed.

The composition is now allowed to harden, which requires usually about forty-eight hours, and the surface is then ground by a suitable grinding machine. A composition consisting of 75 percent of emulsified asphalt and 45 percent Portland cement, and water sufficient to make a liquid paste, is applied to the surface, and worked with the grinding machine, the object being to fill all voids or pits in the surface. This requires about fifteen minutes. The surface is now wiped clean of the paste and after forty-eight hours the surface is ground smooth with a grinding machine using suitable grinding material such as a carborundum bricks put in the grinding machine, water being used with the grinding operation until the surface is ground smooth, presenting a polished clean surface. The surface is now wiped clean and if desired a top dressing may now be applied after twenty-four hours. For this purpose we prefer to use a mineral hardened aqueous emulsion of suitable waxes and gums, carnauba wax being preferred. The wax solution is brushed on the surface and allowed to dry and then buffed off with a buffing machine.

It will be understood that we also contemplate the use of this composition for other purposes such as lining of pools, fountains, stairs, and wherever a finished surface of this material may be desired. We prefer to use the absorbent material, however, the same is not essential and may be omitted and the composition will still give good results.

It will be understood by those skilled in the art that various changes may be made in the composition, in the proportion of the ingredients and yet give good results, although we prefer to use the proportions stated, also that the steps of laying the composition may be varied, without departing from the spirit of our invention as claimed.

We claim:

1. A method of laying an asphalt terrazzo comprising applying on a surface a layer of a plastic composition made of asphalt and water emulsified with hydrous magnesium silicate together with an aggregate, working the layer to compact the same, removing the supernatant mixture of emulsified asphalt and water, allowing the layer to harden, and grinding the surface to a smooth finish.

2. The method of laying asphalt terrazzo comprising applying on a surface a layer of a plastic composition made of asphalt and water emulsified with hydrous magnesium silicate together with an absorbent material and an aggregate, working the layer to compact the same, removing the supernatant mixture of emulsified asphalt and water, allowing the layer to harden, and grinding the surface to a smooth finish.

JOSEPH SALVI.
GEORGE S. CUNNING.